(12) United States Patent
Mast et al.

(10) Patent No.: US 9,511,943 B2
(45) Date of Patent: Dec. 6, 2016

(54) CONVEYOR DEVICE FOR LOADING OR UNLOADING PIECE GOODS WHICH CAN BE SINGULATED

(71) Applicant: J. SCHMALZ GMBH, Glatten (DE)

(72) Inventors: Jonas Mast, Baiersbronn (DE); Valentin Schmidt, Stuttgart (DE); Kay Woeltje, Weil im Schoenbuch (DE); Werner Kraus, Stuttgart (DE)

(73) Assignee: J. Schmalz GmbH, Glatten (DE)

( * ) Notice: Subject to any disclaimer, the term of this patent is extended or adjusted under 35 U.S.C. 154(b) by 0 days.

(21) Appl. No.: 14/786,285

(22) PCT Filed: Apr. 24, 2014

(86) PCT No.: PCT/EP2014/058330
§ 371 (c)(1),
(2) Date: Oct. 22, 2015

(87) PCT Pub. No.: WO2014/174005
PCT Pub. Date: Oct. 30, 2014

(65) Prior Publication Data
US 2016/0068344 A1  Mar. 10, 2016

(30) Foreign Application Priority Data
Apr. 26, 2013  (DE) ........................ 10 2013 207 642

(51) Int. Cl.
*B65G 47/52* (2006.01)
*B65G 21/10* (2006.01)
(Continued)

(52) U.S. Cl.
CPC ............... *B65G 21/10* (2013.01); *B65G 13/12* (2013.01); *B65G 1/04* (2013.01); *B65G 15/12* (2013.01); *B65G 21/14* (2013.01); *B65G 67/08* (2013.01)

(58) Field of Classification Search
CPC .... B65G 37/00; B65G 47/52; B65G 2812/018
(Continued)

(56) References Cited

U.S. PATENT DOCUMENTS

| | | | | |
|---|---|---|---|---|
| 7,641,043 B2 * | 1/2010 | Vestergaard | ............. | B64D 9/00 193/35 R |
| 8,622,199 B2 * | 1/2014 | Windfeld | ............. | B65G 41/005 198/588 |

(Continued)

FOREIGN PATENT DOCUMENTS

| EP | 1667907 | 12/2007 |
|---|---|---|
| EP | 2156927 | 4/2011 |

(Continued)

OTHER PUBLICATIONS

English Language Abstract of JP 6171762.

*Primary Examiner* — Timothy Waggoner
*Assistant Examiner* — Lester Rushin
(74) *Attorney, Agent, or Firm* — Ware, Fressola, Maguire & Barber LLP

(57) ABSTRACT

A conveyor device (10) for the loading or unloading of separable piece goods from a storage area or to a storage area with at least one conveyor belt mechanism (1), which is mounted on a bracket (2), and with a roll-on module (3) for receiving and setting down the separable piece goods, wherein the roll-on module (3) is arranged at a front free end of the conveyor device (10), wherein a curve module (4) is provided between the roll-on module (3) and the conveyor belt mechanism (1), with which a change of direction in the transport direction at least in the horizontal plane is variably adjustable. The roll-on module (3) has two belt ramps (31) running parallel to each other, and the two belt ramps (31) can be actuated separately so that the speeds of the belt ramps (31) can be adjusted differently.

20 Claims, 6 Drawing Sheets

(51) Int. Cl.
*B65G 13/12* (2006.01)
*B65G 21/14* (2006.01)
*B65G 67/08* (2006.01)
*B65G 1/04* (2006.01)
*B65G 15/12* (2006.01)

(58) Field of Classification Search
USPC .................................................. 198/586, 587
See application file for complete search history.

(56) References Cited

U.S. PATENT DOCUMENTS

2004/0262130 A1* 12/2004 Brown ................... B65G 13/04
 198/781.05
2007/0284214 A1 12/2007 Canapa
2012/0097498 A1 4/2012 Campbell et al.

FOREIGN PATENT DOCUMENTS

| JP | 6171762 | 6/1994 |
| WO | 2010070686 | 6/2010 |
| WO | 2012088437 | 6/2012 |

* cited by examiner

CONVEYOR DEVICE FOR LOADING OR UNLOADING PIECE GOODS WHICH CAN BE SINGULATED

CROSS-REFERENCE TO RELATED APPLICATIONS

This application corresponds to international patent application Ser. No. PCT/EP2014/058330, filed 24 Apr. 2014, which claims benefit to German patent application serial no. 10 2013 207 642.8, filed 26 Apr. 2013, which is incorporated by reference in their entirety.

BACKGROUND OF THE INVENTION

1. Field of Invention

The invention concerns a conveyor device for the loading or unloading of separable piece goods from a storage area or to a storage area. Such conveyor devices are used, e.g., to deliver packages or luggage items of various size and/or shape, which need to be delivered from a storage area to further transport in another transport means, such as in the loading and unloading of cargo holds of airplanes. The piece goods are often arranged with no particular order in different positions of a cargo hold and need to be passed on to a transport means or conversely taken from a transport means and placed in the storage area.

Such delivery of separable piece goods is therefore hard to automate and often requires the use of human labor, who hand off piece goods of different size, different weight, and different category between a conveyor belt and a transport means of a warehousing logistics. This is time consuming, labor intensive, and prone to error. Furthermore, only limited piece counts per unit of time can be achieved.

2. Description of Related Art

Therefore, there have been efforts in the prior art to promote an automation of such delivery of piece goods. For example, EP 2 156 927 B1 indicates a conveyor device with a robot with three telescoping arms at a front free end of the conveyor device. The robot is mounted on a kind of bridge, between which a conveyor belt runs for the further transport of the piece goods picked up. However, such a solution has drawbacks in terms of the conveyance speed, since the receiving of piece goods with telescoping arms has to be done each time on the conveyor belt. Furthermore, the bridge spanning the conveyor belt greatly restricts the structural space. From EP 1 667 907 B1 there is known a conveyor device comprising a first, second and third conveyor module, which are connected to each other via an intermediate conveyor device. The conveyor device disclosed there involves an optimization of a hand-off between different conveyor modules thanks to an intermediate conveyor device with corresponding means for the hand-off to the further transport of the piece goods. A sideways adjustment of the transport direction of the receiving means at the front free end of the conveyor device is not described, so that the vehicle carrying the conveyor device has to be repositioned appropriately each time in order to receive variously arranged piece goods with no particular ordering from a cargo space. In US 2007/284214 A1 a conveyor device with the features of the preamble of claim 1 is described.

SUMMARY OF THE INVENTION

The present invention proposes to solve the problem of providing a conveyor device for the transport of separable piece goods which on the one hand enables a high piece count of transported piece goods per unit of time and on the other hand allows an adapting to randomly positioned piece goods in a storage space.

As the solution for this problem, a conveyor device is proposed with the features of claim 1. Advantageous embodiments and modifications of the invention are the subject matter of the dependent claims.

According to the present invention, a conveyor device is provided for the loading or unloading of separable piece goods, such as packages or luggage items, from a storage area or to a storage area with at least one conveyor belt mechanism, which is mounted on a mobile or stationary bracket, wherein a roll-on module or receiving element is provided, which is designed to receive and set down piece goods in the storage area. The roll-on module or receiving module is arranged at a front free end of the conveyor device and has at least one belt ramp preferably tilted from the horizontal plane. Between the roll-on module and the conveyor device there is provided a curve module with which a change of direction of a transport direction in at least the horizontal plane can be variably adjusted.

This conveyor device enables a high piece count per unit of time for a loading or unloading of individual piece goods and it can be adapted flexibly to the handling of elements of different size, different weight, and different shape, such as luggage items or parcel shipments. Furthermore, it can be used under various spatial circumstances, such as for piece goods provided without any particular order in the storage area, situated in any given undefined positions in the storage area. The handling of separable piece goods, such as luggage items or parcel shipments, is simplified and optimized with the conveyor device according to the invention, and one can achieve high piece rates per unit of time. An ongoing transport of the particular piece goods is possible. Thanks to the roll-on module, which is provided at the front free end of the conveyor device and which has one belt ramp preferably tilted in relation to the horizontal plane or several such belt ramps, the piece goods can be picked up or set down. The roll-on module of the conveyor device is brought up to the piece goods being conveyed and thanks to the inclined plane of the belt ramp it enables a lifting or picking up of the piece good without the need for costly grippers, robot arms, or the like.

In addition, a curve module is provided, which is arranged between the front roll-on module and the conveyor belt mechanism or the conveyor belt. The curve module is designed such that a change of direction in regard to the transport direction of the conveyor device is variably adjustable at least in the horizontal plane. In particular, the curve module is designed to provide a transition from the transport direction of the roll-on module to a different transport direction of the conveyor belt mechanism.

In this way, the roll-on module located at the end used to pick up and set down goods can be moved to various specific positions inside a cargo hold and be adjusted according to the orientation of the piece of luggage. A manual feeding of the piece goods by a worker inside the cargo hold is no longer necessary. The conveyor device according to the invention is not limited to a single level of storage of elements. The horizontal orientation, especially of the front-end roll-on module, is variably adjustable to the different situations in the cargo hold or in a storage area. The conveyor device according to the invention is advantageously equipped with a curve module, with which a change in the transport direction can be variably adjusted at least in the horizontal plane. In this way, the adjustment possibilities of the conveyor device and in particular the terminal roll-on module of the conveyor device used for the pick up and set down of goods are further optimized.

Thanks to the curve module, which is provided between the roll-on module and the conveyor device located behind it (in the direction of a receiving of piece goods), the conveyor device can be adjusted variably to the local circumstances and oriented each time to the piece goods being transported. With the conveyor device according to the invention it is therefore possible to provide a receiving and forwarding device with flexible and variable adjustment in three-dimensional space.

The roll-on module can be designed and arranged to be freely movable via servo-drives or other positioning means in any given spatial positions in the vertical or horizontal direction, so that in particular the arrangement in the direction of an x axis, a y axis, and a z axis can be adapted as needed.

The roll-on module, the curve module and the conveyor belt mechanism are preferably positioned directly bordering on each other, so that the piece good can be transported between them each time with no transition segment. In this way, a continuous through delivery stretch is provided. A handling by means of additional grippers or the like at the transition between the segments of the conveyor device is therefore not required. The conveyor device itself forms a kind of through transport element, which is specially adapted for both a picking up or setting down of piece goods and for a specifically oriented further transport of the piece good.

In particular, a first curve module is provided between the roll-on module and the conveyor belt mechanism, and a second curve module is provided between the conveyor belt mechanism and a second conveyor belt mechanism. This further increases the degrees of freedom of a positioning and moving of the elements of the conveyor device. With a second curve module it is possible to change the transport direction along the conveyance line according to the situation. The conveyor device can therefore itself be easily adjusted and positioned at a stationary bracket in a large spatial range. Additional curve modules can also be provided between additional conveyor belt mechanisms following in succession.

According to another advantageous embodiment of the invention, the at least one conveyor belt mechanism is formed from several parallel running conveyor belts which can change their position along the lengthwise dimension relative to each other, so that the length of the transport surface spanned by the conveyor belts can be variably adjusted. This provides a kind of telescoping conveyor belt mechanism whose length can be optimally adjusted to the individual application. As needed, the effective length of a transport surface can be shortened or lengthened.

Preferably means for height adjustment of the conveyor belt mechanism are provided, e.g., a central lift column on which the conveyor device is mounted adjustably in height. Such a central lift column can either be mounted stationary or arranged in a mobile form on a vehicle or the like. A laterally positioned lift column has the advantage over a height adjustment device of the portal or bridge type that the transport stretch is for the most part unlimited in terms of size or height of the piece goods being delivered.

Preferably means of changing a transport direction both in a horizontal plane and in a vertical plane are provided. An adjustment of the transport direction in a horizontal plane occurs, for example, by changing the degree of curvature of a curve module. In addition, the curve module can also be adapted to change the transport direction in a vertical plane, so that a height offset between a first segment and a following second segment of the conveyor device can be adjusted. Furthermore, for this purpose, the conveyor belt mechanisms themselves can also be adjusted, for example, by adjusting an inclination with respect to the horizontal plane.

If, according to another advantageous embodiment, the roll-on module, the curve module and/or the conveyor belt mechanism are each configured with at least two parallel running and separately actuatable conveyor elements, the piece goods on the conveyor device itself can be changed in their orientation. For example, if a package or piece of luggage taken up by the roll-on module does not lie properly with respect to the lengthwise direction of the roll-on module, the package or piece of luggage can easily be corrected in its orientation by a different actuating of the parallel running belt ramps of the roll-on module. For this, it is only necessary to operate the two belt ramps with different speeds, depending on which direction the piece good is improperly oriented in. Such a direction correction is also possible with a curve module or with the conveyor belt mechanism itself, if these are provided with parallel running and separately actuatable conveyor means.

The roll-on module is preferably mounted by means of a servomechanism, by which it can be moved in at least two directions. In this way, the roll-on module can also be swiveled in the horizontal plane, for example. Preferably, the roll-on module can also be swiveled in the vertical plane.

Preferably, the curve module has several consecutive rollers in the transport direction, which can be tilted relative to each other and/or driven actively, preferably independently of each other. Thanks to a tilting of the rollers relative to each other (i.e., the axes of rotation of the rollers relative to each other), the radius of curvature of the curve module can be adjusted to set different degrees of a change in the transport direction by the curve module. Alternatively or additionally, the rollers of the curve module can also be arranged adjustably with respect to each other in the vertical direction. In this way, the transport direction can be changed variably in two spatial planes. By means of driven rollers, the distance between two transported piece goods can also be changed as necessary, e.g., by operating different rollers at different speed.

The roll-on module can have at its front free end additional receiving means, especially in the form of a movable scoop, a driven separating roller or the like. With such additional receiving means, the receiving of piece goods of different shape and size is further facilitated. Such a scoop for example can be shoved underneath packages of any size, so that the package can then be picked up with the roll-on module without manual intervention of an operator. A driven separating roller can rotate in the opposite direction, for example, so that the piece of luggage or the package is lifted up by virtue of friction and can then be further delivered by the belt ramps of the roll-on module. In this way, the process of picking up and setting down the piece goods can be fully automated.

Preferably, a control unit is provided for the position control of the roll-on module and for control of the position and orientation of the curve module and the conveyor belt mechanism. The control unit can be a central control unit, for example, by which an operator can centrally make all the settings of the conveyor device.

For the further configuration, a grip control unit operating preferably in three dimensions with an admittance regulation can be provided. In this way, the roll-on module can easily be adjusted in its position by means of the grip control unit and brought up to the piece goods being delivered. For example, force sensors are provided by means of which forces on the grip control unit, such as those exerted by an operating person, are detected and the position of the roll-on module can also be arranged on controllable axes, preferably adjustable in the three spatial directions. A control unit can be provided directly on the conveyor device itself (especially the roll-on module). Alternatively, the control unit can also be provided as a remote controlled unit.

BRIEF DESCRIPTION OF THE DRAWINGS

In what follows, the invention will be explained further with the aid of the enclosed figures. There are shown.

DETAILED DESCRIPTION OF THE BEST MODE OF THE INVENTION

Figure 1:
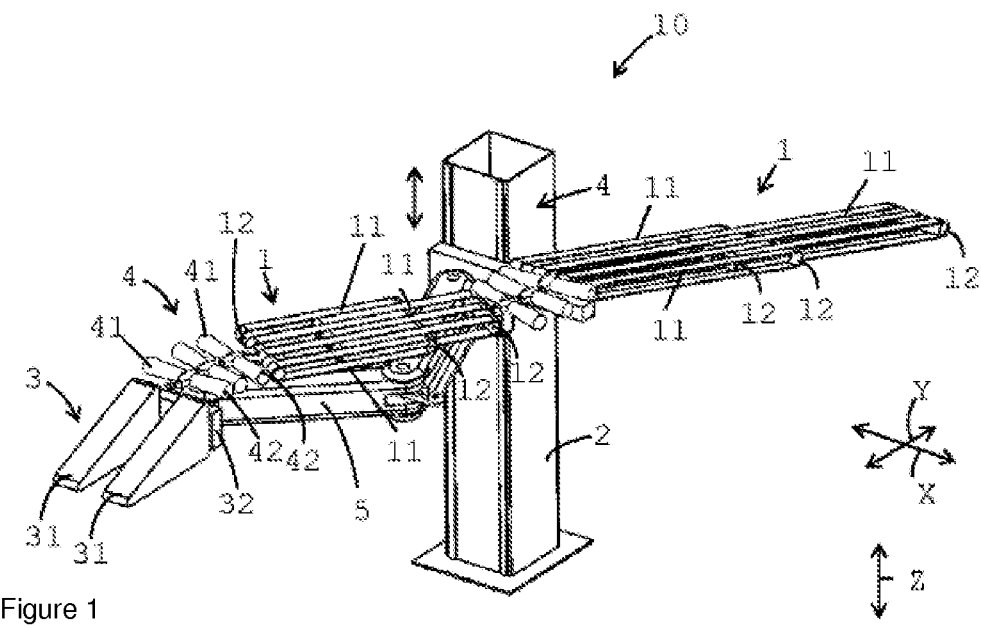
FIG. 1 is a perspective view of a sample embodiment of a conveyor device according to the invention with a central lift column.
Figure 2:
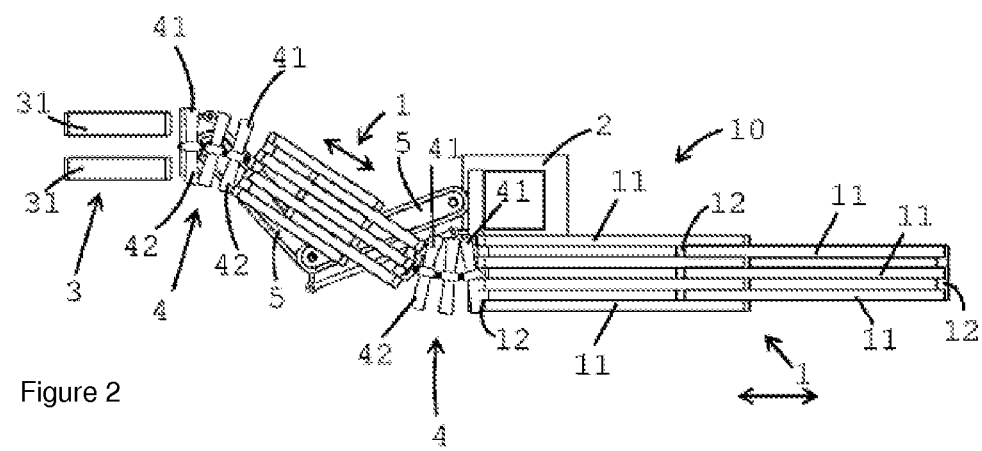
FIG. 2 is a top view from above of the sample embodiment of a conveyor device per FIG. 1.

In FIGS. 1 to 10 a sample embodiment of a conveyor device 10 according to the invention is shown in various positions and orientations in several views. As shown in FIGS. 1 and 2, the conveyor device 10 basically has three different elements, namely, a conveyor belt mechanism 1, a curve module 4 and at the front free end a roll-on module 3. The conveyor device 10 in this sample embodiment is supported by a central bracket 2, which is formed here as a stationary lift column. However, the bracket 2 can also be a mobile bracket, which is mounted for example on a vehicle. The roll-on module 3 here consists of two parallel arranged inclined belt ramps 31, which are mounted at their rear end by a support plate 32. The inclined belt ramps 31 of the roll-on module 3 are each formed with circulating belts (not shown), so that a piece good taken up can be pulled onto the roll-on module 3 and transported further.

Thanks to the slanting, inclined shape of the belt ramps 31, various kinds and sizes of luggage pieces or packages can be automatically taken up with the roll-on module 3 and transported away. Bordering on the roll-on module 3 there is provided a first curve module 4, which consists of rollers 41, 42 arranged next to each other. The rollers 41, 42 are actively driven, so that the piece good can be transported further in the segment of the curve module 4. The rollers 41, 42 can tilt relative to each other, as can be noticed in particular in FIG. 2, so that a change in the transport direction can be adjusted at any given angle of curvature toward a following conveyor belt mechanism 1. In this way, the piece good being transported is further transported from the roll-on module 3 toward the conveyor belt mechanism 1 fastened on the bracket 2. In this sample embodiment, an additional second curve module 4 with rollers 41, 42 is provided, which is provided between a first conveyor belt mechanism 1 and a second conveyor belt mechanism 1.

As the conveyor belt mechanism 1 in this sample embodiment, several parallel arranged conveyor belts 11 are provided, being adjustable in length relative to each other in telescoping manner. The conveyor belts 11 are each driven by drive rollers 12 at the ends. By means of an adjustment of the drive rollers 12, the effective length of the transport distance of each conveyor belt mechanism 1 can be adjusted. In this way, the length of the respective conveyor belt mechanisms 1 can be changed as needed. The conveyor belt mechanism 1 almost follows the adjustment movement of the roll-on module 3, so that in each operating situation a continuous transport stretch of the conveyor device 10 behind the roll-on module 3 is assured. The roll-on module 3 is mounted by an angle arm 5 on the bracket 2. By means of the angle arm 5, the length and position of the roll-on module 3 can be changed at will. With the angle arm 5 the roll-on module 3 can be moved to the side as well as extend and retract toward the front and the rear. The bracket 2 fashioned as a lift column is height adjustable, so that the conveyor device 10 as a whole can be adjusted in height. Alternatively or additionally, the roll-on module 3 can be made height-adjustable via the support plate 32, so that in addition to the height adjustment by the lift column the roll-on module itself can be adjusted in height to a certain degree. The belt ramps 31 of the roll-on module 3 according to this sample embodiment can also be adjusted to the side relative to each other. In this way, the roll-on module 3 can be adapted to different width of luggage items or packages or the like. The two belt ramps 31 of the roll-on module 3 can be actuated separately, so that the speed of the two belt ramps 31 can be adjusted differently. In this way, piece goods taken up on the roll-on module 3 at a slant can be rotated directly into the correct orientation in the transport direction. The rollers 41, 42 of the curve module 4 are also actively driven and can be actuated separately here. In this way, on the one hand it is possible to support the deflecting of the piece goods being transported by operating the rollers 41, 42 at different speed, and on the other hand an orientation of the transported piece good can also be corrected here.

Thanks to the two curve modules 4 and the height adjustment at the bracket 2, the roll-on module 3 can be adjusted as desired in three dimensional space at the front free end of the conveyor device, so that even piece goods in no particular order can be driven up to for hauling away or vice versa set down in a specific desired location in a cargo hold. In this way, a very flexible and variably adaptable conveyor device 10 is provided, which combines the roll-on module 3 forming a receiving element directly with a following transport stretch by means of the curve modules and the conveyor belt mechanisms 1. The grabbing process and the hauling away can therefore be done in a single step. In this way, a very high piece rate per unit of time can be delivered for luggage items or the like. The process, moreover, is continuous, since no hand-off is needed between individual stations in manual or automated manner. According to this sample embodiment (FIGS. 1 and 2) the conveyor belt mechanism 1 is height adjustable. Alternatively or additionally, the conveyor belt mechanism 1 can also be adjustable in its inclination to the horizontal plane. Thanks to the curve modules 4, the front conveyor belt mechanism 1 can be adjusted in its orientation as needed. In addition, both conveyor belt mechanisms 1 can be adjustable in length thanks to the telescoping conveyor belts 11 and the drive rollers 12.

Figure 3:
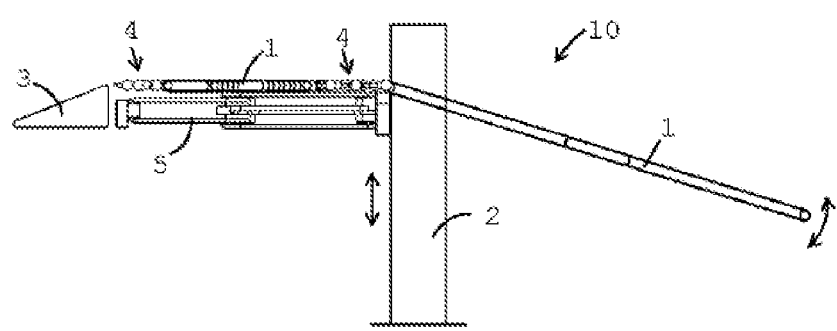
FIG. 3 is a side view of the sample embodiment of a conveyor device according to the invention.
Figure 4:
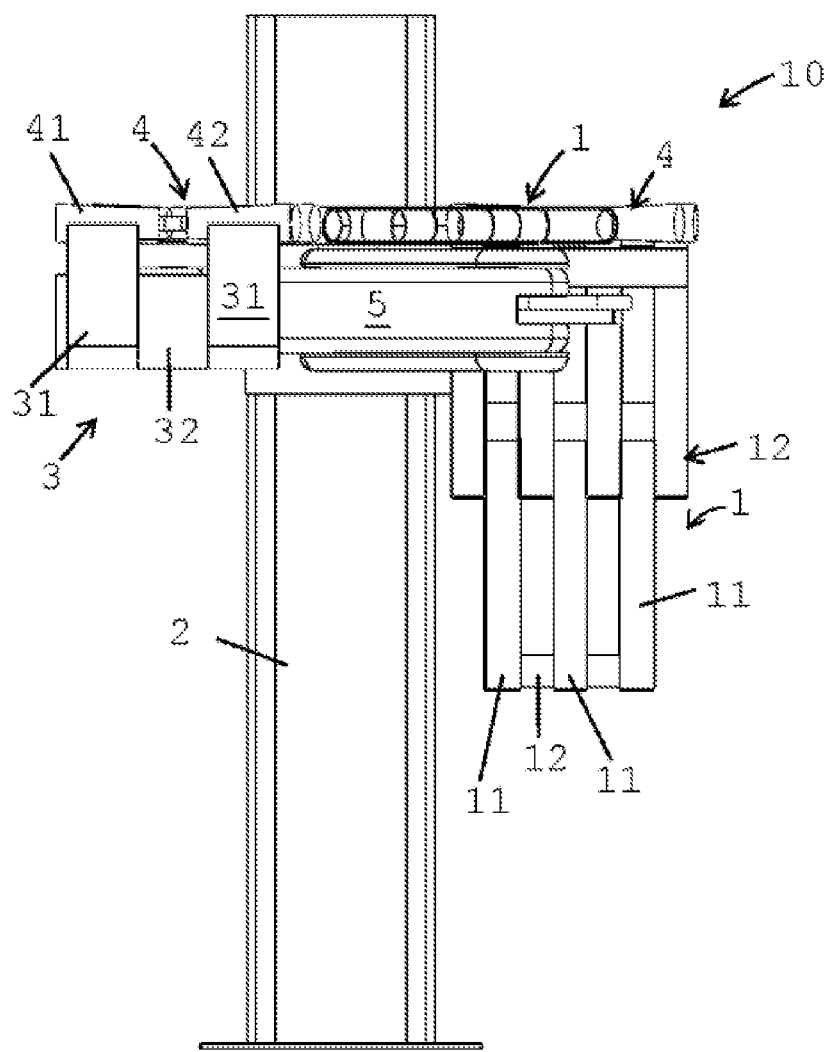
FIG. 4 is a front view of the sample embodiment of a conveyor device according to the invention.
Figure 5:
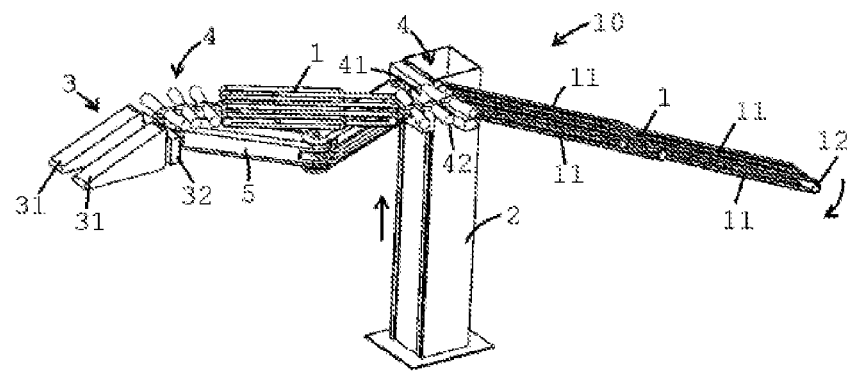
FIG. 5 is a perspective view of the sample embodiment of a conveyor device according to the invention in an upper position on the lift column.
Figure 6:
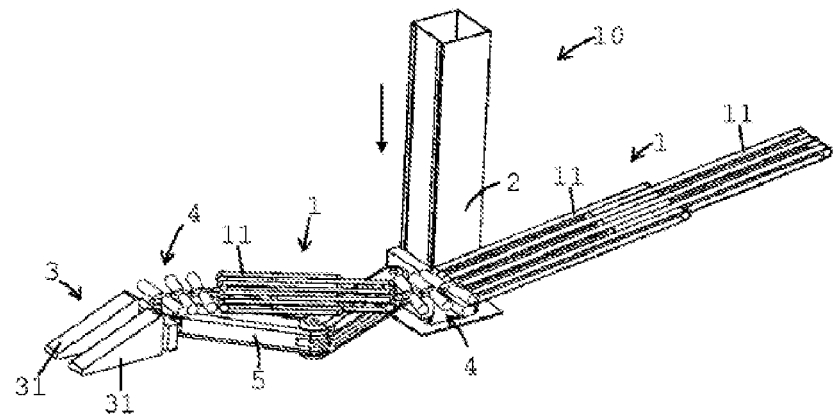
FIG. 6 is a perspective view of the sample embodiment of a conveyor device according to the invention in a lower position on the lift column.

In FIGS. 3 and 4 the conveyor device 10 according to the invention is shown in a situation in which the rear conveyor belt mechanism 1 runs slanting down from the bracket 2, i.e., it is inclined from the horizontal. In FIGS. 5 and 6, the height adjustment by means of the bracket 2 designed as a lift column is illustrated. In FIG. 5, the conveyor device 10 is in its highest position, while the rear conveyor belt mechanism 1 is oriented slanting downward. In FIG. 6, the lowermost position of the conveyor device 10 is shown, and the rear conveyor belt mechanism 1 lies in the horizontal plane. Alternatively, in this depicted situation the rear conveyor belt mechanism 1 can also run slanting upward, depending on where the delivered piece good needs to be unloaded.

Figure 7:
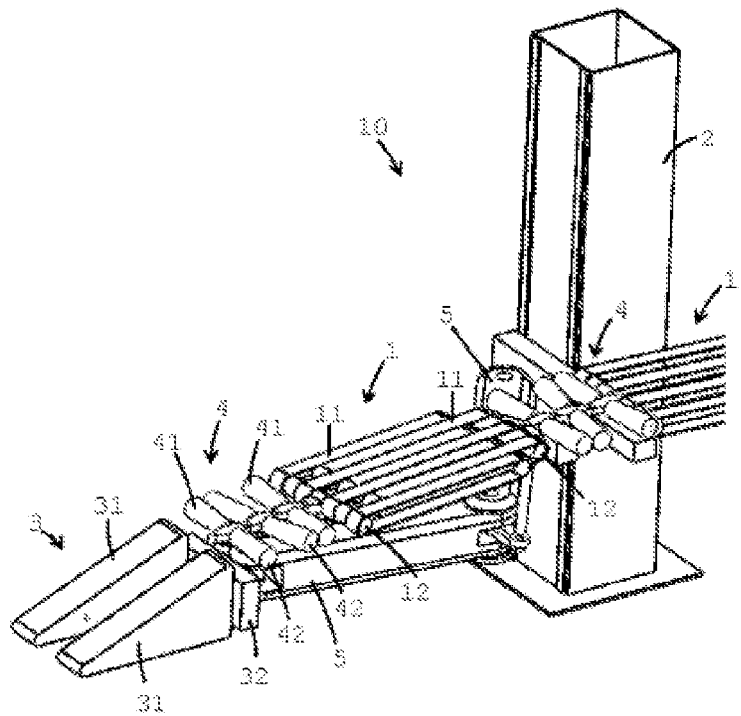
FIG. 7 is a perspective view of the sample embodiment of a conveyor device according to the invention with shortened transport stretch.
Figure 8:
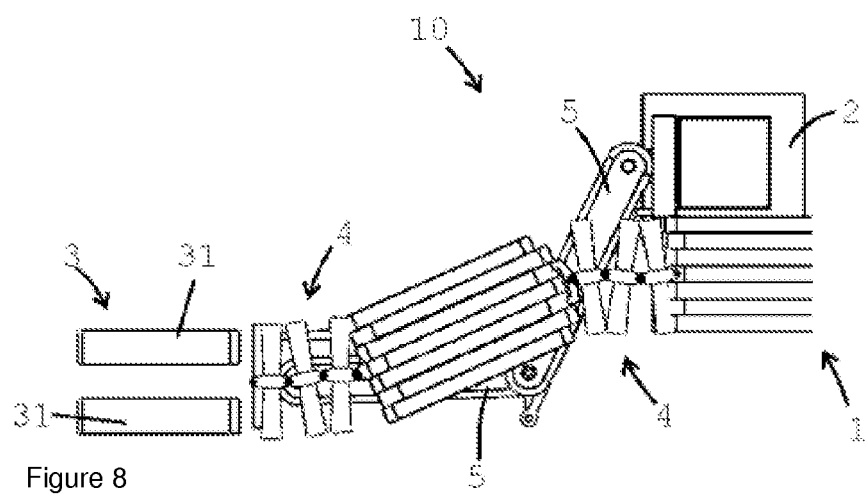
FIG. 8 and FIG. 9 are top views from above of the sample embodiment of a conveyor device of the invention to illustrate the length adjustment of the transport stretch.
Figure 9:
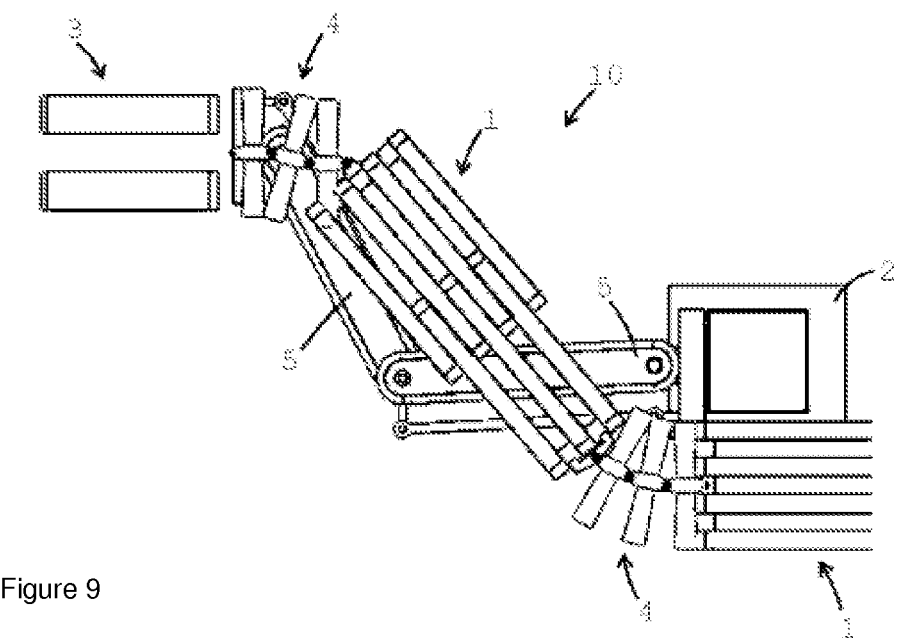

FIGS. 7 and 8 show a situation in which the conveyor belt mechanism 1 is behind the roll-on module 3 in a contracted position, i.e., in a shortened state in regard to length. By an adjustment of the angle arm 5 the drive rollers 12 are automatically pushed toward each other, so that the conveyor belts 11 telescope into each other. In this way, the conveyor belt mechanism 1 is a kind of direct-tracking conveyor belt mechanism, which always automatically follows the position of the front roll-on module 3 and the curve module 4. On the other hand, FIG. 9 shows a situation in which the conveyor belts 11 of the conveyor belt mechanism 1 are telescopically extended from each other, so that the transport stretch of the conveyor belt mechanism 1 is lengthened. In each situation, however, an effective further transport of piece goods to the conveyor belt mechanism 1 by the circulating conveyor belts 11 and the rotating drive rollers 12 is assured. For the activation and adjustment of the conveyor device 10, a central control unit can be provided. By means of the central control unit, the height adjustment of the lift column of the bracket 2 and the adjustment of the angle arm 5 are activated, so that the front roll-on module 3 can be adjusted in almost any desired spatial position within the adjustment capabilities of the conveyor device 10. The central control unit can also be used to change the speed of the conveyor belts 11, the conveyor belt mechanism 1, the driven rollers 41, 42 of the curve modules 4 and the individually actuated belt ramps 31 of the roll-on module 3 as needed each time. In place of a lift column as the bracket 2, a different bracket can be provided. The bracket 2 can be both stationary and mobile in design. For example, one can provide axes which can be actuated in three directions, by means of which the conveyor device 10 can be adjusted at will in the x axis, the y axis and the z axis.

Figure 10:
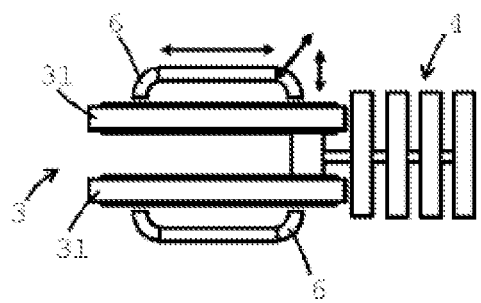
FIG. 10 is a simplified top view of a sample embodiment of the conveyor device of the invention with a grip control unit.

In FIG. 10 an example of a grip control at the roll-on module 3 is shown schematically. At the side of the two parallel running belt ramps 31 there are provided grip controls 6, each one configured as a holding grip. The grip controls 6 are coupled to the angle arm, which can be designed as a hydraulic arm, for example, so that forces applied to the grip controls 6 produce an adjusting of the roll-on module 3 in the particular desired position. This is illustrated in FIG. 10 with the arrows indicated there. According to the invention, a remote control can also be provided, by which all adjustments and activations of the conveyor device 10 can be controlled. In this way, an operator person can move about freely without having to remain directly at the conveyor device 10. The conveyor belt mechanisms 1 instead of being configured with circulating driven conveyor belts 11 can also be configured with driven rollers or a combination of rollers and belts. At the front-end roll-on module 3, additional receiving means can be provided. For example, at the front ends of the belt ramps 31 there can be present a rotating receiving roller or separating roller. Furthermore, in addition or alternatively, projecting scoops or fork elements can be provided at the roll-on module. This further simplifies the automatic receiving of the piece good by the roll-on module 3. By means of the curve modules 4 the transport direction in a horizontal plane can be adjusted in the sample embodiment shown, by tilting the rollers 41, 42 relative to each other, as is shown for example in FIGS. 8 and 9. In addition, the rollers 41, 42 of the curve modules 4 can also be designed tilting in the vertical direction. Or they can be adjustable obliquely from the horizontal plane, in order to realize a height adjustment. In this way, further degrees of freedom can be realized in the movement and adjustment of the transport stretch formed with the conveyor device 10.

The conveyor device 10 according to the invention not only facilitates the picking up and setting down of piece goods of different size, different weight, and different shape. The directly connected conveyor belt mechanism 1 with capability of a length adjustment can be brought directly to the respective position of the roll-on module 3. In this way, the gripping process and the further transport occur in a continuous process, so that very high pick rates can be realized with the conveyor device 10. This means that larger piece numbers per unit of time can be handled with the conveyor device 10, regardless of the geometry and stiffness, for example, of the items and articles being delivered. The conveyor device of the invention is therefore specially designed and advantageous for use in the field of baggage handling, but also in the field of package and parcel handling. As the servo drives for the adjustment of the angle arm 5 and the height adjustment, one can use for example hydraulic servo drives from the field of automation and robotics.

THE SCOPE OF THE INVENTION

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the invention has been described and illustrated with respect to exemplary embodiments thereof, the foregoing and various other additions and omissions may be made therein and thereto without departing from the spirit and scope of the present invention.

The invention claimed is:

1. A conveyor device (10) for the loading or unloading of separable piece goods from a storage area or to a storage area with at least one conveyor belt mechanism (1), which is mounted on a bracket (2), and with a roll-on module (3) for receiving and setting down the separable piece goods, wherein the roll-on module (3) is arranged at a front free end of the conveyor device (10), wherein a curve module (4) is provided between the roll-on module (3) and the at least one conveyor belt mechanism (1), wherein the curve-module (4) is configured to variably adjust the transport direction between the roll-on module (3) and the at least one conveyor belt mechanism (1) at least in the horizontal plane, and wherein the roll-on module (3) has at least two belt ramps (31) running parallel to each other, wherein the at least two belt ramps (31) can be actuated separately so that the speeds of the at least belt ramps (31) can be adjusted differently.

2. A conveyor device (10) according to claim 1, characterized in that the roll-on module (3) is designed and arranged to be movable via servo-drives in any given spatial positions in the vertical or horizontal direction.

3. A conveyor device (10) according to claim 1, characterized in that the roll-on module (3), the curve module (4) and the at least one conveyor belt mechanism (1) are positioned directly bordering on each other, so that a separable piece good can be transported between them each time with no transition segment.

4. A conveyor device (10) according to claim 1, characterized in that a first curve module (4) is provided between the roll-on module (3) and the at least one conveyor belt mechanism (1), and a second curve module (4) is provided between the at least one conveyor belt mechanism (1) and a second conveyor belt mechanism (1).

5. A conveyor device (10) according to claim 1, characterized in that the at least one conveyor belt mechanism (1) is formed from several parallel running conveyor belts (11) which can change their position along their lengthwise direction relative to each other, so that the length of the transport surface spanned by the several parallel running conveyor belts can be variably adjusted.

6. A conveyor device (10) according to claim 1, characterized in that means for height adjustment of the at least one conveyor belt mechanism (1) and/or the roll-on module (3) are provided.

7. A conveyor device (10) according to claim 1, characterized in that means are provided for changing a transport direction in both a horizontal plane and in a vertical plane.

8. A conveyor device (10) according to claim 1, characterized in that the curve module (4) and/or the at least one conveyor belt mechanism (1) are each configured with at least two parallel running conveyor elements which can be actuated separately.

9. A conveyor device (10) according to claim 1, characterized in that the roll-on module (3) is connected by means of a servomechanism, by which it can be moved in at least two directions.

10. A conveyor device (10) according to claim 1, characterized in that the curve module (4) comprises rollers (41, 42) arranged consecutively in the transport direction, which are configured to be tilted relative to each other.

11. A conveyor device (10) according to claim 10, characterized in that the several consecutive rollers (41, 42) can be driven actively, in particular, driven actively and independently of each other.

12. A conveyor device (10) according to claim 1, characterized in that the roll-on module (3) is provided at the front free end with additional receiving means, especially in the form of a movable scoop, a driven separating roller.

13. A conveyor device (10) according to claim 1, characterized in that a control unit is provided for the position control of the roll-on module (3) and for control of the position and orientation of the curve module (4) and the at least one conveyor belt mechanism (1).

14. A conveyor device (10) according to claim 13, characterized in that the control unit is a grip control acting in three dimensions with an admittance regulation.

15. A conveyor device (10) according to claim 13, characterized in that a position control unit of the roll-on module is provided in the three spatial directions of an x axis, y axis and z axis.

16. A conveyor device (10) according to claim 2, characterized in that the roll-on module (3), the curve module (4) and the at least one conveyor belt mechanism (1) are positioned directly bordering on each other, so that a separable piece good can be transported between them each time with no transition segment.

17. A conveyor device (10) according to claim 2, characterized in that a first curve module (4) is provided between the roll-on module (3) and the at least one conveyor belt mechanism (1), and a second curve module (4) is provided between the conveyor belt mechanism (1) and a second conveyor belt mechanism (1).

18. A conveyor device (10) according to claim 2, characterized in that the conveyor belt mechanism (1) is formed from several parallel running conveyor belts (11) which can change their position along their lengthwise direction relative to each other, so that the length of the transport surface spanned by the several parallel running conveyor belts can be variably adjusted.

19. A conveyor device (10) according to claim 2, characterized in that means for height adjustment of the at least one conveyor belt mechanism (1) and/or the roll-on module (3) are provided.

20. A conveyor device (10) according to claim 2, characterized in that means are provided for changing a transport direction in both a horizontal plane and in a vertical plane.

* * * * *